United States Patent
Honma et al.

(10) Patent No.: US 7,978,578 B2
(45) Date of Patent: Jul. 12, 2011

(54) OPTICAL DISC DEVICE AND DEFECT DETECTION METHOD FOR OPTICAL DISC MEDIUM

(75) Inventors: Hiromi Honma, Tokyo (JP); Yasuo Ogasawara, Kanagawa (JP)

(73) Assignees: NEC Corporation, Tokyo (JP); Renesas Electronics Corporation, Kanagawa (JP)

( * ) Notice: Subject to any disclaimer, the term of this patent is extended or adjusted under 35 U.S.C. 154(b) by 321 days.

(21) Appl. No.: 12/282,280

(22) PCT Filed: Mar. 6, 2007

(86) PCT No.: PCT/JP2007/054304
§ 371 (c)(1),
(2), (4) Date: Oct. 14, 2008

(87) PCT Pub. No.: WO2007/102495
PCT Pub. Date: Sep. 13, 2007

(65) Prior Publication Data
US 2009/0097371 A1    Apr. 16, 2009

(30) Foreign Application Priority Data
Mar. 9, 2006 (JP) .................... 2006-064825

(51) Int. Cl.
*G11B 20/18* (2006.01)
(52) U.S. Cl. .................... 369/53.16
(58) Field of Classification Search ........... 369/53.16, 369/53.32
See application file for complete search history.

(56) References Cited

U.S. PATENT DOCUMENTS

| | | | | |
|---|---|---|---|---|
| 4,832,487 A * | 5/1989 | Mikuriya et al. | ......... | 356/243.1 |
| 5,128,911 A * | 7/1992 | Ito et al. | ............... | 369/53.28 |
| 6,683,830 B2 | 1/2004 | Eom | | |
| 7,092,334 B2 * | 8/2006 | Choi et al. | ............ | 369/53.16 |
| 7,457,212 B2 * | 11/2008 | Oh | ................. | 369/47.14 |
| 7,697,405 B2 * | 4/2010 | Mashimo et al. | ......... | 369/275.1 |
| 7,804,756 B2 * | 9/2010 | Haddad et al. | .......... | 369/59.25 |
| 2003/0053381 A1 * | 3/2003 | Takahashi et al. | ......... | 369/30.24 |
| 2005/0185549 A1 * | 8/2005 | Tsai et al. | ............. | 369/53.15 |
| 2005/0286353 A1 * | 12/2005 | Hanano | ................ | 369/44.13 |
| 2006/0018229 A1 | 1/2006 | Senba | | |
| 2006/0187800 A1 * | 8/2006 | Ogura | ................ | 369/124.04 |

FOREIGN PATENT DOCUMENTS

| | | |
|---|---|---|
| JP | 2002-230752 | 8/2002 |
| JP | 2004-348800 | 12/2004 |
| JP | 2006-31890 | 2/2006 |
| WO | 01/52249 | 7/2001 |

OTHER PUBLICATIONS

Japanese Official Action—2008-503862—Jul. 2, 2010.

* cited by examiner

*Primary Examiner* — Hoa T Nguyen
*Assistant Examiner* — Mark L Fischer
(74) *Attorney, Agent, or Firm* — Young & Thompson (57) ABSTRACT

An optical disc device includes an optical head section and a regularity monitoring circuit. The optical head section generates a wobble signal indicating wobbling of a track formed on a recording surface of an optical disc medium based on a reflected light reflected by the optical disc medium. The regularity monitoring circuit judges an existence or absence of a defect on the optical disc medium based on a difference between the wobble signal and a signal indicating the wobble under a normal condition.

15 Claims, 4 Drawing Sheets

OPTICAL DISC DEVICE AND DEFECT DETECTION METHOD FOR OPTICAL DISC MEDIUM

TECHNICAL FIELD

The present invention relates to an optical disc device for detecting defects of an optical disc medium and a defect detection method for detecting defects of an optical disc medium.

BACKGROUND ART

In recent years, an optical disc device such as a CD (Compact Disc) for reproducing music and a DVD (Digital Versatile Disc) for reproducing image has widely spread in order to record large amount of data. In these days, the HD DVD (High Definition Digital Versatile Disc) and the BD (Blue-Ray Disc) have appeared as next-generation DVDs allowing long time reproduction of high-definition images. In an optical disc medium used for these optical disc devices, digital data of music and image are recorded on a data recording surface in a spiral shape as a line of fine record markings. An optical disc device reads the line of fine record markings and reproduces the recorded digital data.

The optical disc device irradiates focused laser light from an optical head to the data recording surface of the optical disc medium whose rotation is controlled by a spindle motor. The optical head includes a laser diode (LD), optical elements, and mechanism for moving laser light in a vertical direction (focusing) and in a radial direction (tracking) to a disc surface. The optical head detects reflected light from the data recording surface of an optical disc medium and is controlled by a focusing and tracking movable mechanism so as to constantly scan the record marking line. The reflected light of a light irradiated to the record marking line is detected by a light detector based on contrasting or polarization and is converted into a reproduction signal being an electric signal. A synchronous clock is extracted by a PLL (Phase Locked Loop) circuit from the reproduction signal detected by the optical head, and simultaneously the reproduction signal is formed to be a pulsed shape based on the synchronous clock. After that, error correction and other processing are performed and music, video, or the like is reproduced.

On the other hand, when recording data on an optical disc medium, the laser light modulated in accordance with user data is irradiated on the data recording surface with a stronger power than that in the reproduction to change a physical property (such as a reflectance and a magnetization direction of a magnetic domain) of micro regions on a recording surface of the optical disc medium. For a recordable CD or DVD medium, a disc medium is employed whose grooving track is wobbled (meandering) in the radial direction. A record timing signal is generated based on this wobbling. A wobbling frequency is required to be higher than the following frequency band of the tracking servo and to be in a low frequency which does not affect the reproduction RF signal. For example, one 192nd of an RF channel frequency is selected as the wobbling frequency for the CD, one 186th of the RF channel frequency for the DVD-R, DVD-RW, and DVD-RAM, and one 32nd of the RF channel frequency for the DVD+R and DVD+RW.

The condition of the wobbling can be detected from the differential (a radial push-pull signal) between two outputs which are respectively outputted by two light detectors arranged in the radial direction detecting the reflected lights from the optical disc medium. The detected signal will be hereafter referred to as the "wobble signal". A recording clock signal synchronized with the wobble signal is generated by a multiplying PLL circuit, and the user data is recorded on the optical disc medium in synchronism with timing of the recording clock signal. Accordingly, even when an eccentricity of the disc or uneven rotation of the disc occurs, the data can be seamlessly recorded at an accurate position on the optical disc medium. Furthermore, address information can be read from the wobble signal by previously forming the wobble for physical position (address) data on the optical disc medium through a phase modulation or a frequency modulation. Thus, recording, additional recording, or overwriting can be executed from any position of the optical disc medium.

The modern optical disc device generally performs the recording on a removable medium, which is different from magnetic disc devices. Further, in order to reduce cost, the medium is not usually protected by a cartridge or the like. For this reason, there is a high possibility of a micro defect because of a scratch and/or dust on the medium surface, in addition to defects that may occur in disc producing. In consideration of this point, the optical disc device performs a strong product code error correction. But sometimes the optical disc device fails to correct the defect depending on the size or frequency of the defect. In the reproduction, it is often possible to mitigate for the defect by disc cleaning so that the medium can be reproduced. However, when recording on the defected medium, the data cannot be recorded because the defect prevents a thermal control. For this reason, defect management in the recording is highly relevant for enhancing the reliability of the optical disc device. The defect management in the recording is generally performed in a following procedure.

(1) Recording data;
(2) Interrupting the recording after a certain period;
(3) Seeking a record starting position;
(4) Reproducing the recorded area;
(5) Seeking a next recording position when the reproduction can be normally performed and returning to (1), or registering the area in a list as a defect area;
(6) Seeking a substitution area;
(7) Recording data in the substitution area;
(8) Seeking a head of the substitution area;
(9) Reproducing data recorded in the substitution area; and
(10) Seeking a next recording position when normally reproduced and returning to (1).

As described above, a lot of time is required since the seeking for verifying the recording state and the disc rotation waiting occurs, resulting in degradation of throughput in the recording. The throughput can be enhanced when a plurality of heads is mounted, as in the case of magnetic disc devices. However, the cost of an optical head mounting optical components is high so that this fashion is difficult to be employed. In addition, it is also one factor that the optical head is heavy and requires long times for seeking and the like. It is difficult to perform the defect management and the substitution recording with interrupting the recording in midstream, especially when data such as subsequently flowing large video data is recorded.

Next, a read signal outputted from the optical head in a case where defects exist on an optical disc medium will be explained. To read the user data recorded in an optical disc medium, the optical disc device produces a reproduction signal allowing detection of difference of a physical state (for example, a reflectance) in a recording area by performing a certain kind of processing (calculation with separately arranged light detectors and the like) on the reflected light from a surface of the recording medium. Normally in the recording, since a physical state on the medium surface is changed by controlling the temperature in an area where laser light is focused, it is difficult to judge the recording state by monitoring a reproduction signal in recording. On the other hand, the wobble signal can be adequately detected in the recording as can be known from a fact that the recording clock signal can be generated in the recording. However, the wobble signal deteriorates when passing the defective area. For example, the amplitude of the wobble signal is reduced in a portion where a scratch or dust exists and an amplitude variation (which is increased in some cases) or phase disturbance occurs in a portion where a fingerprint or contamination is stuck.

In a case of passing such a defective area, the seeking and the rotation waiting have occurred since the recording was interrupted and a recording area is reproduced. However, the recording can be continued without seeking and the like if a recording quality can be judged in the recording process. As a conventional method for detecting a defect in the recording process, Japanese Laid-Open Patent Application JP-P2000-322741A discloses a method for example. In this method, it is detected in the recording that the wobble signal lacks for a certain period or that a cycle of the wobble signal is continuously lying out of the predicted cycle for a certain period and then defect replacement processing is performed. That is, it is judged by capturing deterioration of the wobble signal in recording process whether a defect exists or not.

In this method, the existence or absence of defects is judged based on a wobbling cycle. Therefore, in an optical disc medium whose cycle changes because of the modulation, an error judgment occurs. As such optical disc medium, DVD+R/RW, a CAPA (Complementary Allocated Pit Address) area of the DVD-RAM, HD DVD and BD are given. In addition, in the case that a defect is observed such that the frequency of the wobble signal is approximately constant but the phase of the wobble signal is largely shifted, the defect cannot be determined as a defect. Moreover, there also is a case where the wobble signal is not completely lacked and its amplitude is reduced or increased. In the above method, such a defect cannot be detected.

Figure 1:
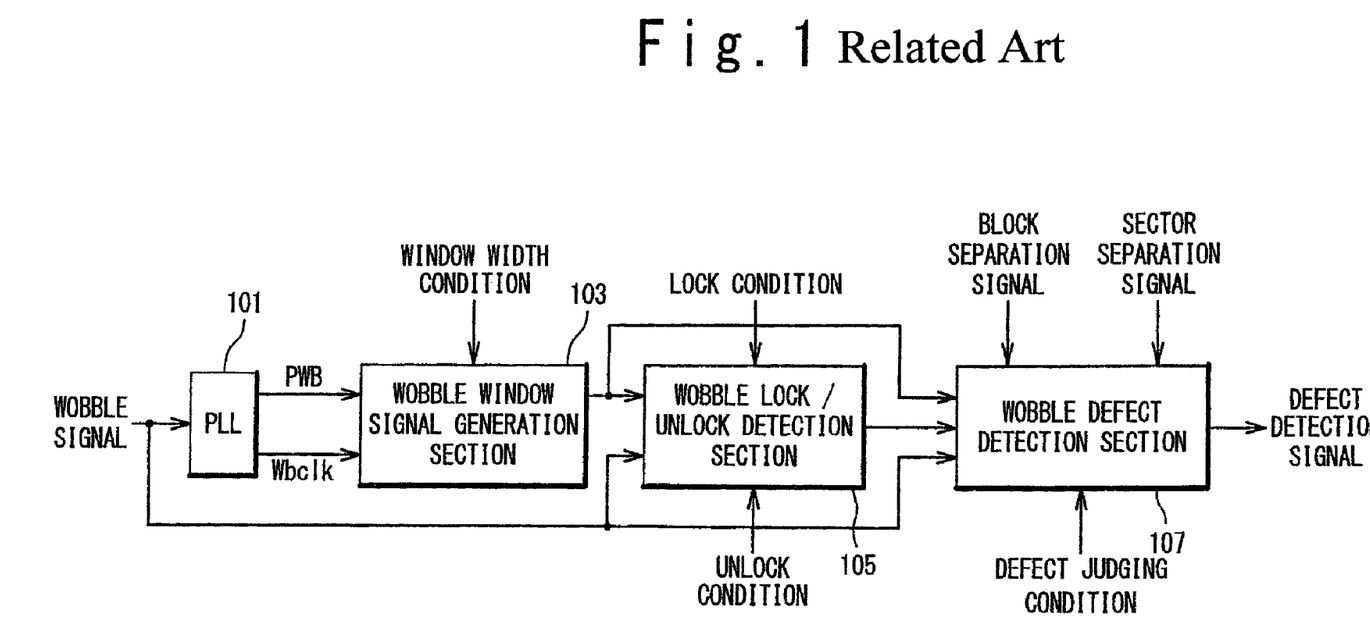
FIG. 1 is a block diagram showing a configuration of a conventional defect detector.

Furthermore, Japanese Laid-Open Patent Application JP-P2002-230752A discloses a method for generating a window of the cycle of the wobble signal in response to an output of the PLL circuit which generates a signal synchronizing the wobble signal and for performing defect detection in recording process based on whether or not an edge of the wobble signal exists in the window. FIG. 1 shows the configuration of this wobble defect detection device which includes a PLL circuit 101, a wobble window signal generation section 103, a wobble lock/unlock detection section 105, and a wobble defect detection section 107. When a wobble signal is applied, the PLL circuit 101, based on the wobble signal, outputs a wobble clock signal Wbclk corresponding to a reproduction clock or a channel clock and outputs a wobble signal PWB to which the PLL (Phase Locked Loop) is applied. The wobble window signal generation section 103 generates a window signal including a condition of a window width based on the applied wobble signal to which PLL is applied. The window width is set on a basis of the number of the wobble clock signals Wbclk given from a system control section. The wobble lock/unlock detection section 105 detects a lock state/unlock state on the basis of the set wobble lock condition and a set wobble unlock condition. When the number of the wobble signals which are not detected in a wobble window interval meets a defect determining condition in units of blocks or sectors, the wobble defect detection section 107 recognizes it as a wobble defect and outputs a wobble defect detection signal.

As described above, since the wobble defect detection device judges a phase shift with the PLL clock, an error judgment occurs in a recording medium whose wobble is phase-modulated similar to the above mentioned method. In addition, there is a problem that a defect causes an amplitude variation of the wobble signal that cannot be detected.

In Japanese Laid-Open Patent Application JP-A-Heisei, 10-269716, address information called ATIP (Absolute Time In Pre-groove) embedded in the wobble signals of CD-R/RW is read. It is judged whether or not an error of the information exists based on CRC (Cyclic Redundancy Code) added to this information, and defect detection is performed in recording process based on the judgment. In this technique, its range can be enlarged to the application for the DVD so that the judgment can be performed based on parity bits in an ADIP (ADress In Pre-groove) of the DVD+R/RW, an LPP (Land Pre-Pit) of the DVD-R/RW, and the CAPA of the DVD-RAM. However, in such distributed pre-pit, there is a problem that a defect locally existing in units of sectors cannot be detected for example.

In addition, Japanese Laid-Open Patent Application JP-P2004-348800A discloses a data reproduction device which reproduces wobble signals from a disc whose recording track is wobbled and determines a scratch on the disc. This data reproduction device includes reading means, wobble signal detecting means, A/D converting means, frequency analyzing means, and scratch estimating means. The reading means reads data from the record track and the wobble signal detecting means detects the wobble signal from the data. The A/D converting means converts the detected wobble signal into a digital signal. The frequency analyzing means performs frequency analysis on the digitized wobble signal. The scratch estimating means outputs a scratch determination signal by determining a scratch on the disc based on a result of the frequency analysis.

Japanese Laid-Open Patent Application JP-A-Heisei, 6-187654 discloses a defect detection circuit of an optical disc device. This defect detection circuit includes a wobble signal detection circuit and a gate circuit. In recording or reproducing the optical disc where a pre-groove of a wave form is inscribed to a track groove, the wobble signal detection circuit detects existence or absence of the wobble signal obtained from the wave form. The gate circuit permits a passage of a signal showing the absence of the wobble signal from the wobble signal detection circuit. The defect detection circuit is configured so as to output a defect signal when the wobble signal disappears at time other than track searching through controlling a gate based on a signal indicating that the track searching is currently processed.

DISCLOSURE OF INVENTION

An object of a present invention is to provide an optical disc device and a defect detection method for detecting defects on an optical disc medium in short time.

Another object of a present invention is to provide an optical disc device and defect detection method for easily detecting defects on an optical disc medium where the wobble signal is intermittently modulated.

In addition, another object of a present invention is to provide an optical disc device and a defect detection method for detecting defects on an optical disc medium for enhancing a throughput in recording in a case where there is a defect in the optical disc medium.

Moreover, another object of a present invention is to provide an optical disc device and a defect detection method for estimating defect positions on an optical disc medium before recording data on the optical disc medium.

According to an aspect of a present invention, an optical disc device includes an optical head section and a regularity monitoring section. The optical head section generates a wobble signal indicating wobbling of a track formed on a recording surface of an optical disc medium based on a reflected light reflected by the optical disc medium. The regularity monitoring section judges an existence or absence of a defect on the optical disc medium based on a difference between the wobble signal and a signal indicating the wobble under a normal condition.

Also, an optical disc device according to a present invention further includes a modulation region estimation unit. The modulation region estimation unit estimates a modulation period where the wobble signal is modulated based on the wobble signal outputted from the optical head section and sets a defect monitoring period based on the modulation period. The regularity monitoring section judges the existence or absence of the defect during the defect monitoring period.

The modulation region estimation unit may include a demodulator which extracts a modulation data from the wobble signal. The modulation region estimation unit extracts the modulation period where the wobble signal is frequency modulated or phase modulated. Here, the modulation region estimation unit sets a period where the wobble signal being modulated is not estimated and a period where the wobble signal is not able to be detected as the defect monitoring period.

An optical disc device according to a present invention further includes an AGC (Automatic Gain Control) circuit which controls an amplifier to make uniform the amplitude of the wobble signal. The AGC circuit outputs a control gain signal indicating the gain of the control for making uniform the amplitude of the wobble signal. The regularity monitoring circuit judges the existence or absence of the defect of the optical disc medium based on a variation of the control gain signal. Here, the regularity monitoring circuit may judge the existence of the defect when the control gain signal exceeds a predetermined gain threshold through a predetermined period of time.

Also, the regularity monitoring circuit includes an amplitude variation detector. The amplitude variation detector detects a varied amplitude which locally varies and appears in the wobble signal outputted through the control of the AGC circuit and whose amplitude is made uniform by the AGC circuit. Based on the detected amplitude variation, the regularity monitoring circuit judges the existence or absence of a defect of the optical disc medium. The regularity monitoring circuit may judge that the defect exists when the number of events where the varied amplitude changes to a value exceeding a predetermined threshold is equal to or more than a predetermined time.

An optical disc device to a present invention further includes a PLL (Phase Locked Loop) circuit which generates a timing signal to synchronize with the wobble signal. The PLL circuit outputs a phase difference signal indicating a phase shift being a phase difference between the timing signal and the wobble signal to the regularity monitoring circuit. The regularity monitoring circuit judges the existence or absence of the defect on the optical disc medium based on the phase shift. Here, the regularity monitoring circuit may judge the existence of the defect when the phase shift exceeds a predetermined phase threshold through a predetermined period of time.

A regularity monitoring circuit according to the present invention judges the existence or absence of the optical disc medium in units of sectors or recording blocks. Also, a control circuit may be further provided that instructs the regularity monitoring circuit to select means for judging the defect of the optical disc medium.

According to another aspect of a present invention, a defect detection method for an optical disc medium includes a wobble signal generating step and a regularity monitoring step. The wobble signal generating step generates a wobble signal indicating meandering of a track formed on a recording surface of an optical disc medium based on a reflected light reflected by the optical disc medium. The regularity monitoring step judges an existence or absence of a defect on the optical disc medium based on a difference between the wobble signal and a signal indicating the wobble under a normal condition.

A defect detection method according to claim 13 may further include a modulation region estimating step. The modulation region estimating step estimates a modulation period where the wobble signal is modulated based on the wobble signal generated by the wobble signal generating step and sets a defect monitoring period based on the modulation period. The regularity monitoring step includes a step of judging the existence or absence of the defect during the defect monitoring period. Also, the modulation region estimating step may include a step of setting a period where the wobble signal being modulated is not estimated as the defect monitoring period; and a step of setting a period where the wobble signal is not able to be detected as the defect monitoring period.

Also, a defect detection method according to a present invention further includes an AGC step for controlling a gain of an amplifier to make uniform the amplitude of the wobble signal. The AGC step includes a step of outputting a control gain information indicating the gain for making uniform the amplitude of the wobble signal. The regularity monitoring step includes a step of judging the existence or absence of the defect of the optical disc medium based on a variation of the control gain signal. Here, the regularity monitoring step may include a step of judging the existence of the defect when a summation of a period where the control gain signal exceeds a predetermined gain threshold is over a predetermined period of time.

Also, the regularity monitoring step preferably includes: an amplitude variation detecting step detecting a varied amplitude which locally varies and is included in the wobble signal that is output via the AGC step and whose amplitude is made uniform at the AGC step; and a step of judging the existence or absence of the defect of the optical disc medium based on the varied amplitude.

A defect detection method according to a present invention includes a PLL step which generates a timing signal to synchronize with the wobble signal and outputs a phase difference signal indicating a phase shift being a phase difference between the timing signal and the wobble signal. Here, the regularity monitoring step includes a step of judging the existence or absence of the defect on the optical disc medium based on the phase shift.

A regularity monitoring step of a present invention includes a step of judging the existence or absence of the optical disc medium in units of sectors or recording blocks. Also, a defect detection method of the present invention may further include a selecting step instructing to select means for judging the defect of the optical disc medium at the regularity monitoring step.

According to a present invention, an optical disc device and a defect detection method for detecting defects on an optical disc medium in short time can be provided.

In addition, according to a present invention, an optical disc device and a defect detection method for easily detecting defects on an optical disc medium where the wobble signal is intermittently modulated can be provided.

Further, according to a present invention, an optical disc device and a defect detection method for detecting defects on an optical disc medium for improving the throughput in recording in a case where there is a defect in the optical disc medium can be provided.

Moreover, according to a present invention, an optical disc device and a defect detection method for estimating defect positions on an optical disc medium before recording data in the optical disc medium can be provided.

BEST MODE FOR CARRYING OUT THE INVENTION

Figure 2:
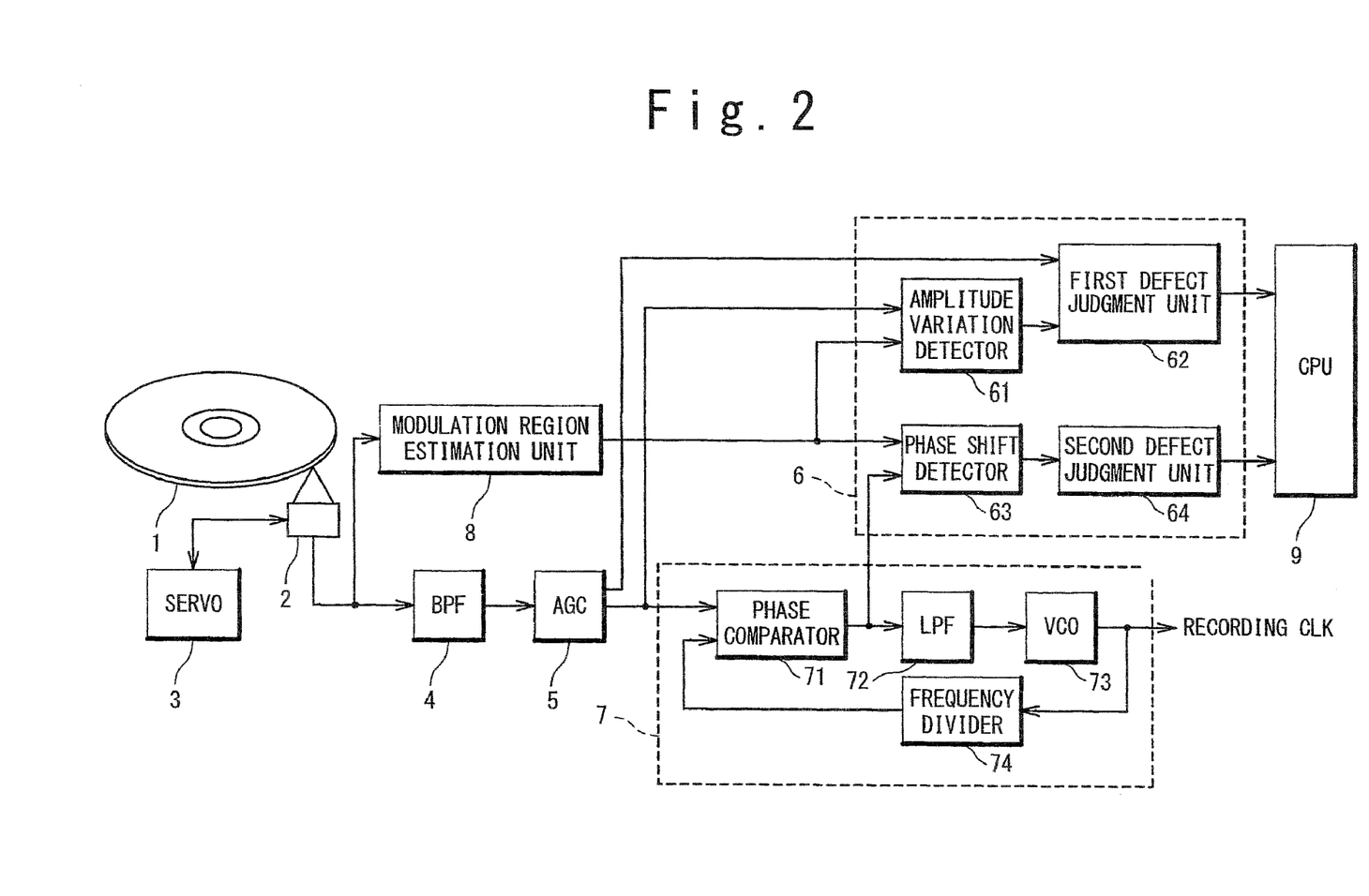
FIG. 2 is a block diagram showing a configuration of an optical disc device according to an exemplary embodiment of a present invention.

Referring to the accompanying drawings, an optical disc device according to best modes for carrying out a present invention will be explained. FIG. 2 is a block diagram showing a configuration of an optical disc device according to an exemplary embodiment. The block diagram shown in FIG. 2 shows a signal system relating to a present invention. Accordingly, the optical disc device further includes blocks for recording and reproducing data such as a modulator and a demodulator but their illustration is omitted here.

The optical disc device includes an optical head 2, an actuator servo 3, a bandpass filter (BPF) 4, an AGC (Automatic Gain Control) circuit 5, a regularity monitoring circuit 6, a PLL (Phase-Locked Loop) circuit 7, a modulation region estimation unit 8, and a CPU (Central Processing Unit) 9. In an optical disc medium 1 used in the optical disc device, tracks are formed in concentric circles or a spiral shape. The tracks meander in a lateral direction of the tracks. The meander is called the wobble, and a reproduction signal varies depending on the track wobbling. A varied amount of the reproduction signal because of the wobbling is a wobble signal, which is used for controlling the rotational speed of the optical disc medium and the like. The rotation of the optical disc medium 1 is controlled by a spindle motor not shown in the figure.

The optical head 2 includes a laser diode, optical elements, objective lens, an objective lens driving actuator, and a photoelectric converter, and makes a focused beam spot follow a groove track of the optical disc medium 1. The photoelectric converter receiving reflected light from the optical disc medium 1 converts data inscribed in the groove track into an electric signal based on the reflected light. In addition, the photoelectric converters are separately arranged in two portions in a direction corresponding to the radial direction of the optical disc medium 1, and a differential signal of the electric signals outputted from both of them is used as a wobble signal. The generated wobble signal is supplied to the BPF 4 and the modulation region estimation unit 8. Moreover, the optical head 2 detects a positional deviation in the vertical direction and the radial direction of the disc medium 1 based on the reflected light from the disc medium 1. Information of the detected positional deviation is transferred to the actuator servo 3.

The actuator servo 3 controls the objective lens driving actuator incorporated in the optical head 2. The actuator servo 3 makes the focused laser light accurately follow with respect to jiggling of the disc surface and the eccentricity of the disc on a basis of the information of the displacement detected by the optical head.

The modulation region estimation unit 8 includes a demodulator for extracting modulation data from the wobble signal outputted by the optical head 2, and estimates a modulation state of the wobble signal. In a case of the wobble signal in which a phase modulation is intermittently embedded such as the DVD+R/RW, when the passband of the BPF 4 is narrowed, amplitude of the wobble signal reproduced from the wobbling of the phase modulation portion varies or its phase shifts. Accordingly, the regularity monitoring circuit 6 may erroneously detect a defect. For this reason, a period where the modulation region estimation unit 8 cannot detect that the wobble signal is processed to have modulation and a period where it cannot be estimated that the detected wobble signal is modulated are set as defect monitoring periods, and the modulation region estimation unit 8 notifies the regularity monitoring circuit 6 to monitor defects of the optical disc medium 1. In the DVD-RAM, a CAPA (Complementary Allocated Pit Address) area is estimated to set the defect monitoring periods. In a case of the CD-R/RW, the defect monitoring periods are constantly set since the modulation of frequency is small.

The BPF 4 enhances the SNR (Signal to Noise Ratio) of the wobble signal. The wobble signal may be directly inputted from the optical head 2 to the AGC circuit 5 without a band limitation by the BPF 4, however, the AGC circuit 5 at a next step will operate more stably when the BPF 4 attenuates noise components.

The AGC circuit 5 keeps amplitude of the wobble signal in constant, and supplies the wobble signals whose amplitude is adjusted to be approximately uniform to the PLL circuit 7 and the regularity monitoring circuit 6. By making the amplitudes uniform, clocks synchronized with the wobble signal are easily generated. When the amplitudes of the wobble signals are corrected to be constant by the AGC circuit 5, variations of the amplitudes due to a defect and the like can be detected as a variation of the control gain. Accordingly, the AGC circuit 5 outputs a control gain signal showing the control gain to the regularity monitoring circuit 6. This control gain signal may be directly inputted to the regularity monitoring circuit 6 and used for the defect detection. The wobble signal generally has a low SNR, and thus there is a possibility to amplify the noise when the loop gain is increased. Accordingly, the loop gain of the AGC circuit 5 is not so high. In addition, in a case of the DVD-R/RWx1 for example, the loop band of the AGC circuit 5 is set to 2 kHz or less so that the control gain cannot be varied by a scratch of about 1 mm.

As well-known, the PLL circuit 7 includes a phase comparator 71, a lowpass filter (LPF) 72, a voltage control oscillator (VCO) 73, and a frequency divider 74. The PLL circuit 7 generates a recording clock signal synchronized with the wobble signals whose amplitudes are made approximately uniform by the AGC circuit 5 and supplies the clock signal to respective parts of the optical disc device. An output of the phase comparator 71 is supplied to the regularity monitoring circuit 6 as a phase difference signal. When recording to the optical disc medium 1 is not required, the frequency divider 74 is unnecessary and an output of the VCO 73 may be fed back to the phase comparator 71 without being divided. The controlling frequency bandwidth of the PLL circuit 7 is set in accordance with consideration of the compression of a high bandwidth noise and to follow the eccentricity of the disc. Thus, it is designed so that a phase of the wobble signal does not rotate so much in passing a normal defect. In a case where a large phase error occurs in a relatively short period, it can be determined that there is a high possibility of a defect.

The regularity monitoring circuit 6 includes an amplitude variation detector 61, a first defect judgment unit 62, a phase shift detector 63, and a second defect judgment unit 64. The amplitude variation detector 61 and the first defect judgment unit 62 detect defects of an optical disc medium 1 on a basis of amplitude information of the wobble signal outputted from the AGC circuit 5. The phase shift detector 63 and the second defect judgment unit 64 detect defects of an optical disc medium 1 on a basis of phase information of the wobble signal outputted from the PLL circuit 7.

In the defect monitoring period set by the modulation region estimation unit 8, the amplitude variation detector 61 detects existence or absence of the amplitude variation on a basis of the amplitude of the wobble signal outputted by the AGC circuit 5 whose amplitude is adjusted. Here, the existence or absence of the amplitude variation is judged by comparing a difference between maximum amplitude and minimum amplitude to a predetermined amplitude threshold for every one period of the wobbling. There are two types of the predetermined amplitude thresholds: an amplitude threshold for a case of increase of the amplitude; and an amplitude threshold for a case of decrease of the amplitude, and the judgment is executed by a binary comparator. When the amplitude varies over the predetermined amplitude threshold, the amplitude variation detector 61 outputs an amplitude abnormal flag. In a period other than the defect monitoring period set by the modulation region estimation unit 8, the amplitude variation detector 61 does not output the amplitude abnormal flag. A false-detection may be avoided by controlling the first defect judgment unit 62.

The first defect judgment unit 62 judges in units of sectors or recording blocks whether or not the variation is a defect on a basis of the amplitude abnormal flag detected by the amplitude variation detector 61. Here, the first defect judgment unit 62 integrates the amplitude abnormal flag in units of the sectors by using an integrator and informs a sector whose integration value exceeds a threshold to the CPU 9 as a defect sector. By counting the number of appearances of the amplitude abnormal flag, a sector may be determined as a defect sector when the appearance is detected at a predetermined number of times or more. When the wobbling amplitude continues to be decreased within the following speed of the AGC circuit 5, the above mentioned amplitude variation detector 61 cannot perform the judgment. Accordingly, the first defect judgment unit 62 judges a defect of an optical disc medium 1 on a basis of the control gain signal showing an adjustment gain being the gain when the AGC circuit 5 adjusts the amplitude of the wobble signal. When the control gain signal shows that the AGC circuit 5 amplifies the wobble signal with a gain equal to or more than a predetermined gain and over a predetermined time, the first defect judgment unit 62 judges it as a defect. That is, when a period where the amplitude of the wobble signal is abnormally small is long, the first defect judgment unit 62 judges that there is a defect on the optical disc medium 1, and informs it to the CPU 9. By monitoring the amplitude of a signal inputted to the AGC circuit 5, the judgment may be performed on the basis of the decrease of the amplitude.

The phase shift detector 63 detects existence or absence of the phase shift of the wobble signal during the defect monitoring period set by the modulation region estimation unit 8. Here, if a large phase shift is detected in the PLL circuit 7 at time when the modulation region estimation unit 8 cannot detect that the wobble signal is processed to have modulation, that is, in a period where it is presumed that a phase shift does not occur in the wobble signal, the phase shift detector 63 judges the shift as the phase shift. The phase shift is judged by performing the full-wave rectification on an output of a charge pump incorporated in the phase comparator 71 and comparing it to a phase threshold $\theta$max. That is, when the absolute value of the phase shift exceeds the phase threshold $\theta$max, the phase shift detector 63 judges that a phase shift is detected Upon detecting the phase shift, the phase shift detector 63 outputs the phase abnormal flag to the second defect judgment unit 64. When the modulation region estimation unit 8 does not set the defect monitoring period, the phase shift detector 63 avoids false detection of the phase shift by holding a phase difference supplied from the phase comparator 71 to zero. Or an output of the phase comparator 71 may be set to 0.

The second defect judgment unit 64 judges in units of sectors or recording blocks whether or not the variation is a defect on a basis of the phase abnormal flag outputted by the phase shift detector 63. Here, the second defect judgment unit 64 integrates the phase abnormal flag in units of the sectors by using an integrator and informs the sector whose integration value exceeds a threshold to the CPU 9 as a defect sector. By counting the number of appearances of the phase abnormal flag, the sector may be determined as a defect sector when the appearance is detected at a predetermined number of times or more.

The CPU 9 finally judges the existence or absence of a defect of the optical disc medium 1 on a basis of information informed from the regularity monitoring circuit 6. That is, the CPU 9 judges the existence or absence of the defect in units of sectors or recording blocks on a basis of at least one of the result of defect judgment by the first defect judgment unit 62 and the result of defect judgment by the second defect judgment unit 64. Defect determination results of the two defect judgment units may be integrated into one result and be inputted to the CPU 9. In addition, when a defect is found, the CPU 9 determines a countermeasure for the defect, for example the defect substitution, and instructs the selected countermeasure to the respective portions in the optical disc device.

These detection circuits may be realized by digital circuits. In this case, an A/D converter is required at a previous stage or a subsequent stage of the BPF 4. In addition, when the defect replacement is performed in recording process, registration of defect areas and second data recording are subsequently performed on a basis of this defect determination result. It can be judged whether or not the data recording to a recording position is possible or not just before recording data on the basis of the defect determination result.

Next, referring to figures, an operation of the optical disc device which judges defects of an optical disc medium 1 will be explained. The modulation region estimation unit 8 estimates a modulation state of the wobble signal outputted by the optical head 2. Setting periods other than periods where the wobble signal can be presumed to be modulated as the defect monitoring periods, the modulation region estimation unit 8 prompts the regularity monitoring circuit 6 to monitor defects of the optical disc device 1. In the DVD-RAM, the defect monitoring period is set on a basis of an area presumed to be CAPA area. In the CD-R/RW, the defect monitoring periods are constantly set since the modulation of frequency is small.

Among the operations for defecting judgment in the defect monitoring periods set as described above, the operation for performing the defect judgment from the amplitude of the wobble signal will be explained referring to FIGS. 3A to 3G.

Figure 3A:
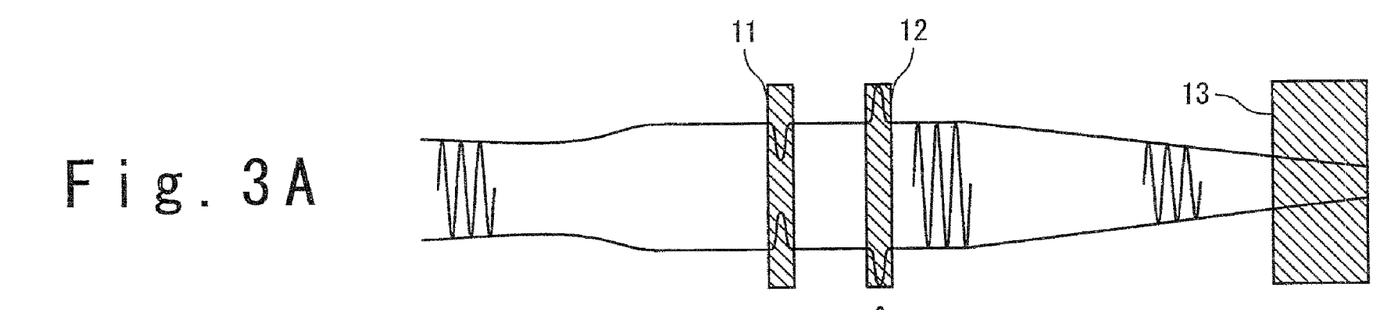
FIGS. 3A to 3G are views explaining an operation for detecting a defect from amplitude of a wobble signal.

As shown in FIG. 3A, the wobble signal whose frequency band is limited by the BPF 4 is inputted to the AGC circuit 5. Shaded areas in the figure show defect areas 11, 12, and 13. The amplitude of the wobble signal shown by an envelope is temporarily decreased in the defect area 11 and the amplitude of the wobble signal shown by the envelope is temporarily increased in the defect area 12. In the defect area 13, there is a long term period where the amplitude of the wobble signal is small.

Figure 3B:
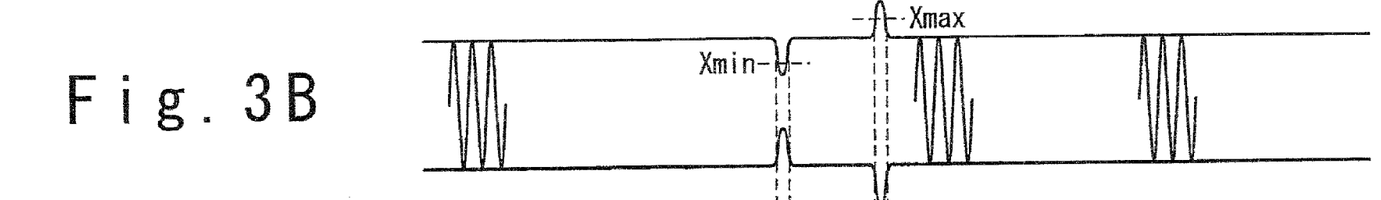

The AGC circuit 5 operates so as to even the amplitude of this signal. Accordingly, as shown in FIG. 3B, slow amplitude variation of the wobble signal is corrected by the AGC circuit 5 and the envelope of the wobble signal becomes approximately constant. However, for example, in a case of the DVD-R/RWx1, the loop band of the AGC circuit 5 is set to 2 kHz or less so that the control gain is not made to vary by scratches of about 1 mm. When there is a micro scratch in the optical disc medium 1, the amplitude of the wobble signal rapidly varies. Thus, also in the defect area 11 and the defect area 12, the amplitude rapidly varies so that the AGC circuit 5 does not follow the amplitude variation, and the rapid amplitude variation appears in the output.

Figure 3C:
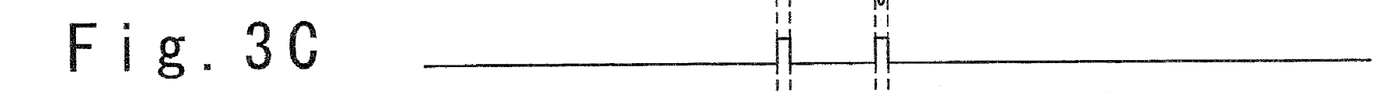

The amplitude variation passing this AGC circuit 5 is compared to an amplitude threshold Xmax and an amplitude threshold Xmin in the amplitude variation detector 61. Since the amplitude becomes smaller than the amplitude threshold Xmin in the defect area 11, the amplitude variation detector 61 outputs the amplitude abnormal flag. Since the amplitude becomes larger than the amplitude threshold Xmax in the defect area 12, the amplitude variation detector 61 outputs the amplitude abnormal flag. The amplitude variation detector 61 detects the amplitude at a speed of from a fraction of several to several times of a wobble basic frequency. Accordingly, as shown in FIG. 3C, the amplitude variation detector 61 outputs the amplitude abnormal flag corresponding to the defect areas 11 and 12.

The first defect judgment unit 62 integrates the abnormal flags outputted by the amplitude variation detector 61 for each sector. As shown in FIG. 3F, the first defect judgment unit 62 compares an integrated value calculated in the integrator which increases every time when the abnormal flag is inputted with a threshold Imax. In FIG. 3, when the amplitude abnormal flag for the defect area 12 is outputted, the integrated value exceeds the threshold Imax. As shown in FIG. 3G, the first defect judgment unit 62 notifies the CPU 9 of detecting a defect that cannot be restored in a sector including the defect areas 11 and 12. FIG. 3E shows a sector cycle, and the integrated value integrated by the first defect judgment unit 62 is reset as shown in FIG. 3F when changing a sector.

Figure 3D:
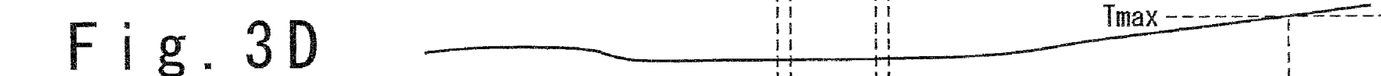
Figure 3E:
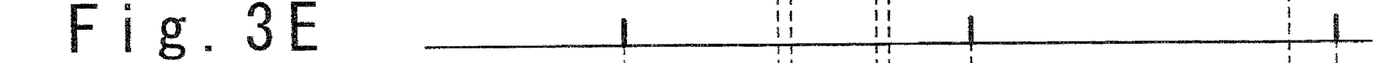
Figure 3F:
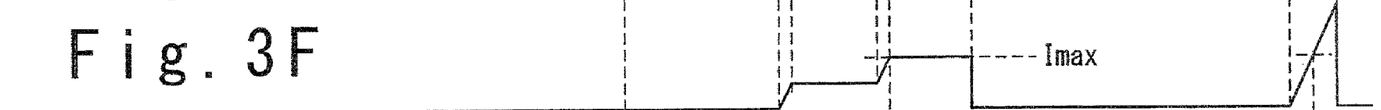
Figure 3G:
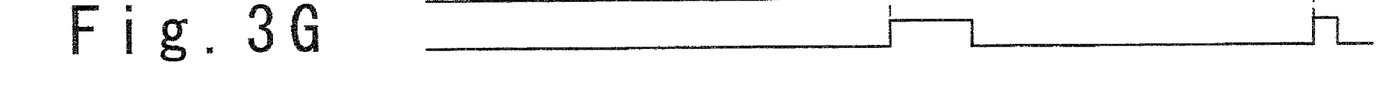

Moreover, subsequently to the defect area 12, the amplitude of the wobble signal gradually decreases within the following speed on the AGC circuit 5, and the AGC circuit 5 increases the gain and operates so as to even the amplitude of the wobble signal as shown in FIG. 3D. Accordingly, the envelope of the amplitude of the wobble signal becomes approximately constant as shown in FIG. 3B, on the other hand, the control gain of the AGC circuit 5 increases as shown in FIG. 3D. The first defect judgment unit 62 compares this control gain to a threshold Tmax and performs integration during the period where the gain exceeded the threshold Tmax by using the integrator. When this integration value exceeds the threshold Imax, that is, when the amplitude of the wobble signal is decreased for a long period, the first defect judgment unit 62 notifies the CPU 9 of detecting a defect that cannot be restored in a sector (FIG. 3G). This defect that the amplitude is decreased for a long period is also reset when changing a sector (FIG. 3F).

The case where the amplitude rapidly varies and the case where the amplitude is decreased for a long period are individually explained above. Also in a case where the amplitude is decreased for a long period with including a rapid variation, the integration can be calculated by the integrator included in the first defect judgment unit 62.

Figure 4A:
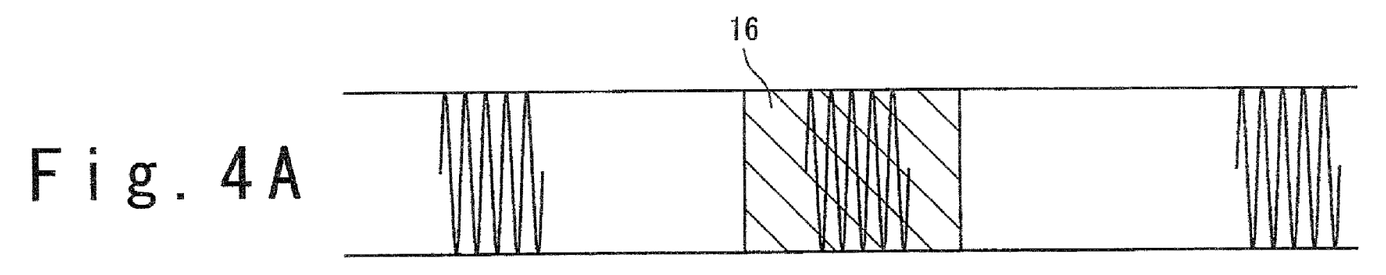
FIGS. 4A to 4F are views explaining an operation for detecting from a phase error.
Figure 4B:
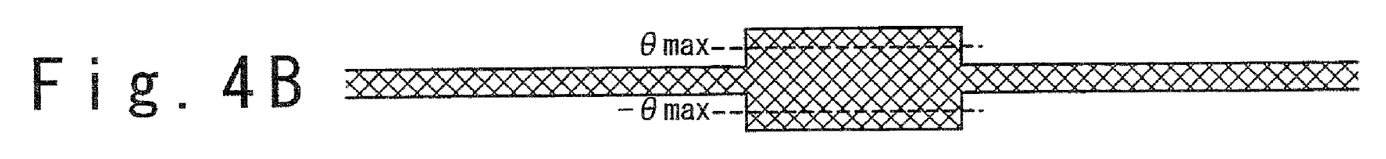
Figure 4C:
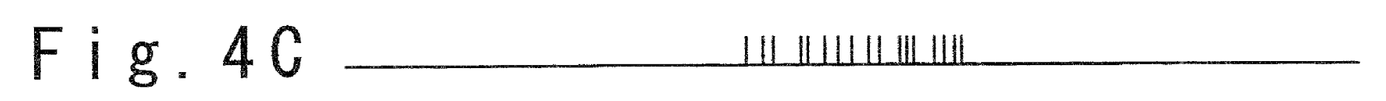

FIGS. 4A to 4F are figures for explaining an operation for judging a defect of an optical disc medium 1 on the basis of a phase of the wobble signal. As shown in FIG. 4A, an output of the AGC circuit 5 is controlled so that the envelope of the wobble signal becomes constant. Shaded areas in the figures show a defect area 16. In the defect area 16, the amplitude variation of the wobble signal is small, however, a large phase shift is detected. That is, as shown in FIG. 4B, a small phase shift is corrected by the PLL circuit 7 in an area other than the defect area 16 and synchronization is kept, however, distribution of an output of the phase comparator 71 in the PLL circuit 7 increases. As shown in FIG. 4C, when the absolute value of the output of this phase comparator 71 is the phase threshold θmax or more, the phase shift detector 63 outputs the phase abnormal flag to the second defect judgment unit 64.

Figure 4D:
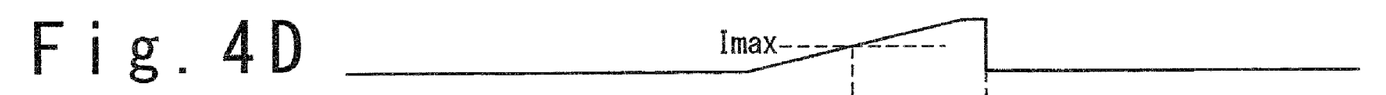
Figure 4E:
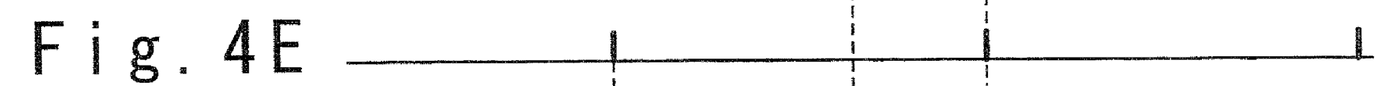
Figure 4F:
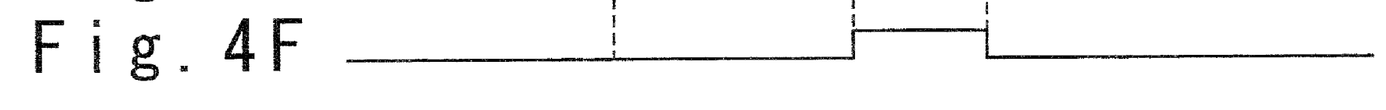

The second defect judgment unit 64 integrates the phase abnormal flags outputted by the phase shift detector 63 by using the incorporated integrator (FIG. 4D). When the integrated value of the phase abnormal flag exceeds the threshold Imax, the second defect judgment unit 64 informs the CPU 9 that the sector is a defect sector (FIG. 4F). The judgment of the defect sector may be performed by counting the number of outputs of the phase abnormal flag and when the counted value exceeds a predetermined value. FIG. 4E shows a cycle of a sector, and the integrated value calculated by the integrator is reset every time when the sector changes (FIG. 4F).

As described above, the optical disc device detects the amplitude variation of the wobble signal based on the corrected wobble signal outputted by the AGC circuit 5 and of the control gain signal showing a gain adjusted for the correction. Based on this amplitude variation, the optical disc device can estimate a defect area of the optical disc medium 1. In addition, the optical disc device detects a phase shift of the wobble signal based on a phase error amount detected by the PLL circuit 7 generating a timing signal synchronized with the wobble signal. Based on the phase shift of the wobble signal, the optical disc device can estimate a defect area of the optical disc medium 1. In addition, by providing the modulation region estimation unit 8 for estimating whether or not the wobble signal is modulated for masking the defect judgment, false judgment in a disc medium on which a modulated region exists where the wobbling phase largely shifts like the DVD+R/RW can be prevented. Accordingly, by at least one of the judgment due to the amplitude variation and the judgment due to the phase shift, the optical disc device can detect defects even in recording process. Furthermore, a common optical disc device includes the AGC circuit for shaping the wobble signal, the PLL circuit for generating a record clock, and a detector circuit of the modulated wobble signal for generating data for the estimation by the modulation region estimation unit, so that it is not required to add circuits of large scale for realizing the defect detection.

As explained above, a deterioration level can be detected from the wobble signal and it is possible to estimate a defect position on the optical disc medium before data recording. In addition, since the wobble signal can be detected even in the recording and defect substitution processing can be realized without interrupting the recording based on the deterioration level of the wobble signal, the throughput in the recording is enhanced.

According to a present invention, an optical disc device and a defect detection method for detecting a defect in an optical disc medium in short time can be provided.

In addition, according to a present invention, an optical disc device and a defect detection method for easily detecting a defect in an optical disc medium where the wobble signal is intermittently modulated can be provided.

Furthermore, according to a present invention, an optical disc device and a defect detection method for improving the throughput in recording process in a case where there is a defect in an optical disc medium can be provided.

Moreover, according to a present invention, the optical disc device and a defect detection method for presuming a defect position on an optical disc medium before recording data in the optical disc medium can be provided.

The invention claimed is:

1. An optical disc device, comprising:
    an optical head section configured to generate a wobble signal to indicate wobbling of a track formed on a recording surface of an optical disc medium, based on a reflected light reflected by the optical disc medium;
    a regularity monitoring section, comprising a regularity monitoring circuit, configured to judge an existence or absence of a defect on the optical disc medium, based on a difference between the wobble signal and a signal indicating the wobble under a normal condition;
    an Automatic Gain Control (AGC) circuit comprising an amplifier, the AGC configured to control a gain of the amplifier such that the amplifier outputs an adjusted wobble signal wherein an amplitude of the wobble signal is made uniform, and also to output a control gain signal indicating the controlled gain,
    wherein the regularity monitoring circuit is configured to judge the existence or absence of the defect of the optical disc medium based on a variation of the control gain signal,
    wherein the regularity monitoring circuit comprises an amplitude variation detector configured to detect a varied amplitude which locally varies and is included in the adjusted wobble signal outputted from the AGC circuit, and
    wherein the regularity monitoring circuit is configured to judge the existence or absence of the defect of the optical disc medium based on the varied amplitude.

2. The optical disc device according to claim 1, further comprising:
    a modulation region estimation unit configured to estimate a modulation state of the wobble signal and to set a defect monitoring period based on the modulation state,
    wherein the regularity monitoring section is configured to judge the existence or absence of the defect during the defect monitoring period.

3. The optical disc device according to claim 2, wherein the modulation region estimation unit comprises a demodulator configured to extract a modulation data from the wobble signal and to determine where the wobble signal is frequency modulated or phase modulated.

4. The optical disc device according to claim 2, wherein the modulation region estimation unit is configured to set the defect monitoring period based on a period wherein the wobble signal being modulated is not estimable by the modulation region estimation unit, and based upon a period where the wobble signal being processed to have modulation is not detectable by the modulation region estimation unit.

5. The optical disc device according to claim 1, wherein the regularity monitoring circuit is configured to judge the existence of the defect when the control gain signal exceeds a predetermined gain threshold through a predetermined period of time.

6. The optical disc device according to claim 1, wherein the regularity monitoring circuit is configured to judge that the defect exists when a number of events, in which the varied amplitude changes to a value exceeding a predetermined threshold, is equal to or more than a predetermined value.

7. The optical disc device according to claim 1, further comprising:
    a PLL (Phase Locked Loop) circuit configured to generate a timing signal to synchronize with the wobble signal and output a phase difference signal indicating a phase shift being a phase difference between the timing signal and the wobble signal, and
    the regularity monitoring circuit is configured to judge the existence or absence of the defect on the optical disc medium based on the phase shift.

8. The optical disc device according to claim 7, wherein the regularity monitoring circuit is configured to judge the existence of the defect when the phase shift exceeds a predetermined phase threshold through a predetermined period of time.

9. The optical disc device according to claim 1, wherein the regularity monitoring circuit is configured to judge the existence or absence of the defect in units of sectors or recording blocks.

10. A defect detection method for an optical disc medium, comprising:
    a wobble signal generating step generating a wobble signal indicating wobbling of a track formed on a recording surface of an optical disc medium based on a reflected light reflected by the optical disc medium;
    a regularity monitoring step judging an existence or absence of a defect on the optical disc medium based on a difference between the wobble signal and a signal indicating the wobble under a normal condition; and
    an Automatic Gain Control (AGC) step controlling a gain of an amplifier such that the amplifier outputs an adjusted wobble signal wherein an amplitude of the wobble signal is made uniform, and outputting a control gain signal indicating the controlled gain,
    wherein the regularity monitoring step comprises a step of judging the existence or absence of the defect of the optical disc medium based on a variation of the control gain signal, and
    wherein the regularity monitoring step comprises:
    an amplitude variation detecting step detecting a varied amplitude which locally varies and is included in the adjusted wobble signal of the AGC step; and
    judging the existence or absence of the defect of the optical disc medium based on the varied amplitude.

11. The defect detection method according to claim 10, further comprising:
    a modulation region estimating step estimating a modulation state of the wobble signal is modulated based on the wobble signal generated by the wobble signal generating step and setting a defect monitoring period based on the modulation state,
    wherein the regularity monitoring step comprises:

a step of judging the existence or absence of the defect during the defect monitoring period.

12. The defect detection method according to claim 11, wherein the modulation region estimating step comprises:
   setting the defect monitoring period based on a period where the wobble signal being modulated is not estimable by a modulation region estimation unit; and
   setting the defect monitoring period based on a period where the wobble signal being processed to have modulation is not detectable by the modulation region estimation unit.

13. The defect detection method according to claim 10, wherein the regularity monitoring step comprises a step of judging the existence of the defect when a summation of a period wherein the control gain signal exceeds a predetermined gain threshold is over a predetermined period of time.

14. The defect detection method according to claim 10, further comprising:
   a PLL step generating a timing signal to synchronize with the wobble signal and outputting a phase difference signal indicating a phase shift being a phase difference between the timing signal and the wobble signal, and
   the regularity monitoring step comprises judging the existence or absence of the defect on the optical disc medium based on the phase shift.

15. The defect detection method according to claim 10, wherein the regularity monitoring step comprises a step of judging the existence or absence of the defect in units of sectors or recording blocks.

* * * * *